455-619 AU 233 EX
FIP8106 XR 3,187,260
June 1, 1965 D. E. DOVE 3,187,260
CIRCUIT EMPLOYING CAPACITOR CHARGING AND DISCHARGING THROUGH TRANSMISSION LINE PROVIDING OPPOSITE-POLARITY PULSES FOR TRIGGERING BISTABLE MEANS
Filed April 19, 1963
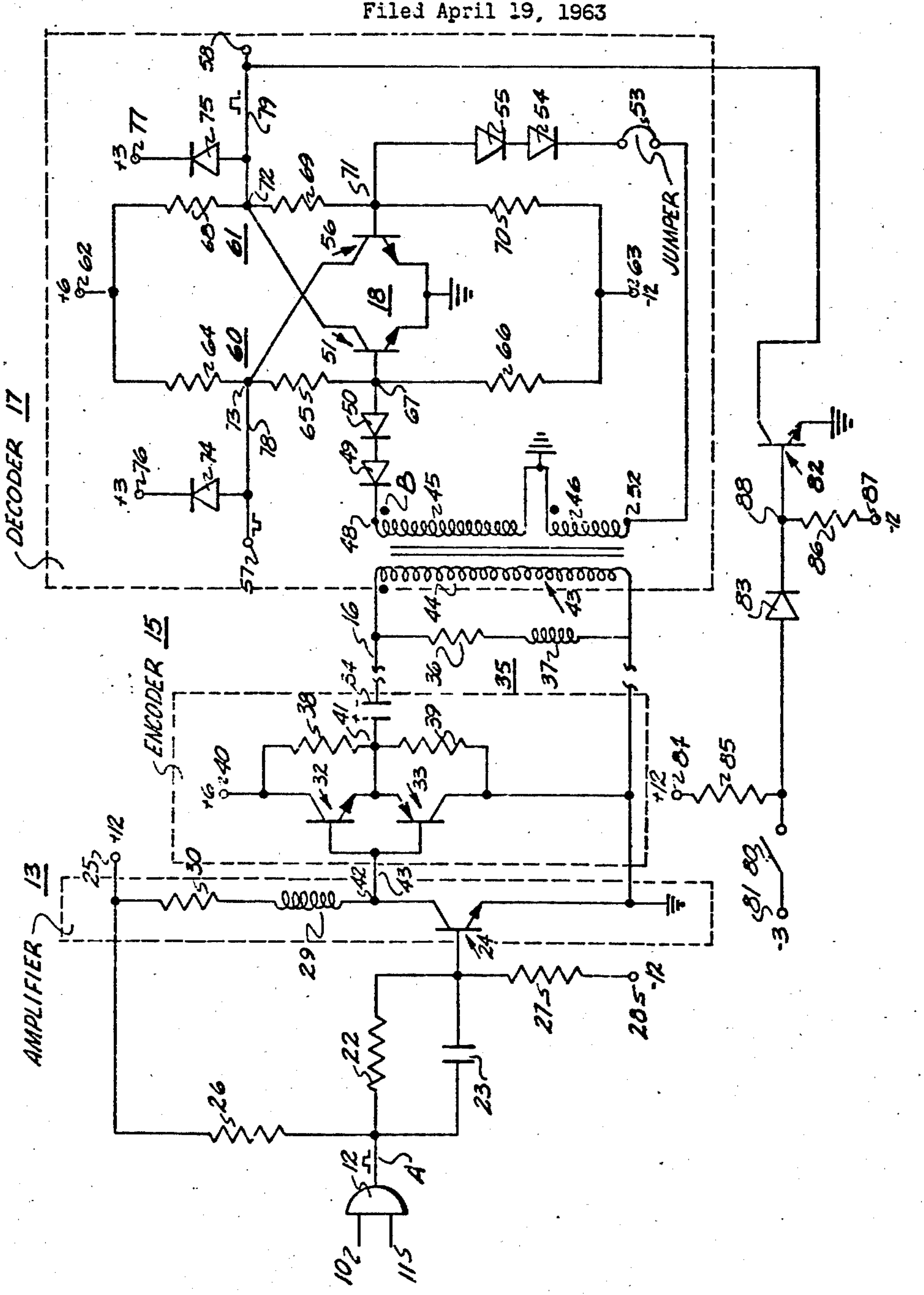
INVENTOR.
DONALD E. DOVE
BY
ATTORNEY.

3,187,260
Patented June 1, 1965

3,187,260

CIRCUIT EMPLOYING CAPACITOR CHARGING AND DISCHARGING THROUGH TRANSMISSION LINE PROVIDING OPPOSITE-POLARITY PULSES FOR TRIGGERING BISTABLE MEANS

Donald E. Dove, Phoenix, Ariz., assignor to General Electric Company, a corporation of New York Filed Apr. 19, 1963, Ser. No. 274,152
7 Claims. (Cl. 328—57)

This invention relates to the transmission of messages by pulse code techniques and more particularly to a new and improved communication system for the transfer of signals from a computer over long transmission lines at variant repetition rates to the computer's peripheral equipment.

Signals in computing systems are signified in the majority of cases by the absence or presence of one or more discrete direct or steady voltage levels. These signals change variant rates and at times also vary slightly from their predetermined amplitudes. A certain amount of voltage variation from their predetermined amplitudes can be tolerated without producing erroneous signals, however, larger variations from these voltage levels will cause erroneous information. To transfer signals from the logic circuits of a computer along a signal transmission line to associated peripheral equipment by means of direct or steady voltage level changes, requires a minimum of difference in the predetermined amplitude of the voltages, shielding of the transmisison line from noises resulting from transient voltages in the electrical circuitry, and minimum deterioration of the signals through losses in the transmission line.

Sufficient signal deterioration by induced noise voltages and line losses to produce erroneous information can occur in the transfer of direct or steady voltage changes over long transmission lines of, for example, 150 feet or more. This is particularly evident with increased computer speeds and the reduced direct voltage levels necessary to facilitate these speeds.

Blocking oscillators have been used to couple the logic circuits of the computer to the transmission line which interconnects the computer and its associated peripheral equipment. This type of oscillator requires magnetization of the transformer inductance until circuit saturation occurs whereupon the induced voltages in the windings disappear. Desaturation then occurs during the remaining portion of the cycle. The switching interval needed for the unidirectional pulses to build up from zero to their final voltage value and then reset to zero renders this type of encoding of the signals of the logic circuits of the computer to slow for high speed computer action.

Thus, other modes of transferring signals from the logic circuits of a computer to its associated peripheral equipment are needed.

Signals available at the computer as direct or steady voltage levels must be available at the computer's peripheral equipment at these same voltage levels and conversely those signals available at the peripheral equipment must be available at the computer; however, the circuitry interconnecting the computer and its associated peripheral equipment need not have this constraint placed on it. The input signals may be transmitted through the interconnecting transmission line without reference to a fixed potential. That is, the signals may be a succession of alternating polarity voltage levels coupled to the transmission line with the amplitude of the alternating pulses increased to compensate for transmission line signal degradation.

It is therefore one object of this invention to provide a new and improved communication system.

Another object of this invention is to provide a new and improved communication system in which signals are transferred from the logic circuits of a computer to its associated peripheral equipment and back without reference to a fixed potential.

A further object of this invention is to provide a new and improved communication circuit in which signals representing information conveyed along a transmission line of 150 feet or more at variant repetitious rates are distorted to compensate for signal degradation by line losses.

A still further object of this invention is to provide a new and improved communication system in which alternating signals representing information are conveyed along a transmission line at repetition rates up to 10 megacycles.

A still further object of this invention is to provide a new and improved communication system in which signals represented by direct voltage levels are transferred along a signal transmission line without reference to a fixed potential and then stored.

Other objects and advantages of this invention will become apparent from the following description when taken in connection with the accompanying drawing.

In accordance with the invention claimed, a new and improved communication system is provided for interconnecting a computer and its associated peripheral equipment. This system is supplied from the logic circuits of the computer with signals represented by direct voltage levels which are translated into alternating polarity voltage levels by a capacitive means. These alternating voltage pulses are transmitted along the transmission line interconnecting the computer's logic circuits and the computer's peripheral equipment. The transmission line is terminated with an impedance mismatching means which distorts the pulses at the end of the transmission line to increase their amplitudes and thereby compensate for signal amplitude degradation through line losses and induced noise voltages. At the end of the transmission line, the alternating pulses are steered according to their polarity to the terminals of a bistable circuit such as, for example, a flip-flop where they serve as the flip-flop's trigger. The flip-flop then reconstitutes the signals represented by the direct voltage levels applied by the logic circuits to the transmission line.

The figure of the drawing is a schematic diagram illustrating the invention.

Referring to the drawing by characters of reference, the figure shown illustrates a communication system for the controllable transfer of rectangular signal pulses from the gated input conductors 10 and 11 and AND-gate 12 of the logic circuits of a computer or pulse generating means through signal amplifier 13 to an encoder 15. Encoder 15 converts or translates the rectangular signal pulses received from amplifier 13 into pulses of alternating polarity, that is, a short pulse of one polarity at the leading edge of each of the rectangular pulses and a short pulse of opposite polarity at the trailing edge of each of the rectangular pulses, for transmittal along an electric circuit such as transmission line 16 to a decoder 17. Decoder 17 comprising a bistable means such as a flip-flop 18 steers the alternating pulses according to their polarities to particular terminals of the flip-flop for reconstituting the alternating pulses into signal pulses representing the direct voltage levels applied to encoder 15 by AND-gate 12.

More particularly, the gated input conductors 10 and 11 transmit signals represented by steady voltage levels to the input of AND-gate 12. The output of AND-gate 12 will be a signal represented by a relatively high steady voltage level when the signals transmitted by both of the gated input conductors to AND-gate 12 are represented by a relatively high voltage level. The output of AND-gate 12 will be a signal represented by a relatively low steady or direct voltage level when either or both of the signals transmitted by the gated input conductors 10 and 11 to AND-gate 12 are represented by relatively low steady or direct voltage levels. Thus, the output of AND-gate 12 is a series of signals occupying at all times one of two steady or direct voltage levels. These signals form a series of rectangular pulses generated by the changing of the output of AND-gate 12 from one steady voltage level to another steady voltage level. One of these signal pulses is diagrammatically shown at A on the drawing. The rectangular pulses shown at A are transmitted through a parallel arrangement of resistor 22 and capacitor 23 to the base of a normally non-conducting NPN transistor 24.

Transistor 24 is normally non-conductive because in the absence of a positive input signal to its base from AND-gate 12, its base is held negative with respect to its emitter by current flow from terminal 25 connectd to a plus 12 volt source through resistors 26, 22 and 27 to terminal 28 connected to a minus 12 volt source. Transistor 24 has its emitter grounded and its collector connected through an inductor 29 and resistor 30 to terminal 25. The collector of transistor 24 is connected to the bases of NPN and PNP transistors 32 and 33, respectively.

Transistors 32 and 33 comprise a part of encoder 15 which receives the amplified substantially rectangular pulses from amplifier 13 and translates them into short peaked alternating pulses of opposite polarities for transmittal through transmission line 16 to decoder 17. These short pulses occur in time corresponding to the change in voltage levels of the rectangular pulses and have polarities determined by the direction of voltage changes of the rectangular pulses. The translation of the rectangular pulses into alternating pulses of opposite polarity is accomplished through the use of a capacitor 34 connected at one side to the interconnected emitters of transistors 32 and 33 and at the other side in series circuit with transmission line 16. Transmission line 16 is terminated adjacent decoder 17 by an impedance means 35 comprising a resistor 36 and an inductor 37. The impedance of means 35 is intentionally higher than the impedance of transmission line 16 so as to cause wave reflections on the transmission line and thereby intentional wave distortions.

The collectors of transistors 32 and 33 shunted by series connected resistors 38 and 39 are connected respectively, to terminal 40 which is connected to a plus 6 volt source and to ground. The emitters of transistors 32 and 33 are connected at node 41 to the series connected resistors 38 and 39.

Transistor 32 is normally conducting in the absence of a positive input pulse to the base of transistor 24 from AND-gate 12 since the base of transistor 32 is now more positive than its emitter. Current flows from terminal 40 through the collector and emitter of transistor 32 and resistor 39 to ground. Part of this current flow passes through capacitor 34 and the mismatching means 35 to ground, thereby charging capacitor 34 to approximately 6 volts. After capacitor 34 charges to 6 volts, the current flow from terminal 40 through capacitor 34 stops until a signal is introduced into the claimed communication system by AND-gate 12 as hereinafter explained. A transformer 43, having its primary winding 44 connected at one end to the end of transmission line 16 and the other end to ground, has a current flow through its primary winding 44 during the charging period of capacitor 34. During this charging period a voltage is induced in a pair of secondary windings 45 and 46 of transformer 43.

The heavy black dots adjacent given ends of the windings of transformer 43 shown in the drawing indicate at a given time like polarities.

Upon the introduction into the claimed communication system by AND-gate 12 of a relatively high steady voltage level signal carrying information and the subsequent application of this signal to the base of transistor 24, transistor 24 is rendered conductive since its base is now more positive than its emitter. Transistor 24 now provides a current path from terminal 25 through resistor 30, inductor 29, collector and emitter of transistor 24 to ground. This flow of current through the collector and emitter of transistor 24 lowers the potential of node 42 adjacent the collector of transistor 24 which lowers the potential on the bases of transistors 32 and 33. Transistor 32 is now rendered non-conductive and transistor 33 is now rendered conductive because their bases are now rendered more negative than their emitters. The raising and lowering of the potential of node 42 corresponding with the conduction and non-conduction of transistor 24 produces on conductor 43 interconnecting node 42 and the bases of transistors 32 and 33 rectangular pulses which are inverted amplified reproductions of the pulses introduced into the communication system by AND-gate 12.

The rendering of transistor 33 conductive and transsistor 32 non-conductive reduces the charge on capacitor 34. Current flows from the positive side of charged capacitor 34 through the emitter and collector of transistor 33 to ground and from ground through the primary winding 44 of transformer 43 to the negative side of capacitor 34. This current flow through winding 44 also induces a voltage in windings 45 and 46.

The voltage induced in windings 45 and 46 of transformer 43 by the discharge of capacitor 34 upon the conduction of transistor 33 produces a negative going pulse at B on the drawing. As long as the output of AND-gate 12 remains at its relatively high steady or direct voltage level, transistors 24 and 33 will remain conductive. When the output of AND-gate 12 is reduced to its relatively low steady or direct voltage level, transistor 24 is rendered non-conductive, thereby raising the potential of node 42. Raising the potential of node 42 renders transistor 32 conductive and transistor 33 non-conductive. When transistor 32 is rendered conductive, capacitor 34 is again charged to approximately 6 volts as previously explained.

The charging current flow for capacitor 34 passes through winding 44 of transformer 43 causing a voltage pulse to be introduced in windings 45 and 46 which pulse provides a positive or reverse polarity pulse at B. The input signal illustrated at A is thus translated into polarized pulses by the capacitor 34 which are then transmitted along circuit or transmission line 16 to transformer 43.

Since the transmission line 16 is terminated by the mismatching impedance means 35 which has a higher impedance than the characteristic impedance of the transmission line 16, the signal wave transmitted along line 16 will be distorted. The distorted wave representing the transmitted signal voltage wave at the end of the transmission line 16 adjacent the mismatching means 35 may be expressed as the sum of the incident and reflective waves. The incident wave is that wave traveling from the signal generating means or encoder 15 toward the mismatching means 35, and the reflective wave is that wave traveling from the mismatching means 35 toward capacitor 34 and is generated at the mismatching means as a result of the incident wave. The actual voltage existing on transmission line 16 is the sum of the voltages of the incident and reflective waves.

When the load impedance is infinite such as with an open circuit at the end of transmission line 16, the incident and reflected waves will have equal magnitudes at the load and the reflection will be such that the voltages of the incident and reflected waves will have the same phase. As a result, the voltages of the two waves add arithmetically and the resulting voltage at the end of the transmission line 16 will be twice the incident wave voltage. As the distance from the load end of the transmission line increases, the incident wave advances in phase while the reflected wave lags correspondingly. The vector sum of the voltages of the two waves is then less than the arithmetic sum.

When the load impedance is greater than the characteristic impedance of the transmission line as disclosed herein, the reflective wave produced at the load end of the line is smaller than the incident wave and the actual voltage existing at the end of the transmission line adjacent the mismatching means 35 is the sum of the voltages of the incident and reflective waves.

The use of a line terminating impedance higher than the characteristic impedance of the line results in a distorted voltage wave at the end of the transmission line having a voltage amplitude higher than the signal introduced into the circuitry by encoder 15. This type of signal wave transmission compensates for signal deterioration over long transmission lines of, for example 150 feet or more, and results at the end of the transmission line in an amplified signal for triggering the flip-flop 18 forming a part of the decoder means.

A more detailed explanation and suitable equation describing the reflective voltage wave characteristics of a mismatched transmission line are described in the fourth edition, Chapter 4, and particularly, pages 82 through 95 of Electrical and Electronic Engineering by Frederick E. Terman, published by McGraw-Hill Book Company, Inc. in 1955.

This new and improved encoding technique employed converts voltage level changes to corresponding pulses of alternating polarity. The pulse position and polarity of the code carries the information through transmission line 16. As mentioned, the rectangular input pulses are converted to more readily transmissible information by providing a short pulse of one polarity at the leading edge of the rectangular pulse and a short pulse of opposite polarity at the trailing edge of the rectangular pulse. The height of the alternating pulses over a certain minimum necessary to trigger the decoder 17 is not material. Only the polarity and temporal position of the alternating pulses are of importance. Many of the prior art problems such as attenuation of the signals and induced voltage noises are greatly reduced with this new encoding and signal transmitting technique.

Transmission line 16 which may comprise a coaxial cable transmits the pulses of alternating opposite polarities to decoder 17. Decoder 17 comprising transformer 43 has the transformer's secondary windings 45 and 46 connected at their free ends through pulse directing means to given terminals of the bistable means 18.

Decoder 17 is provided to decode the sharp pulses of alternating polarity transmitted by transmission line 16 and to reconstitute them into replicas of the steady or direct voltage level signals rendered by AND-gate 12. To accomplish this function, the voltage pulses produced by windings 45 and 46 of transformer 43 must be steered according to their polarity to given terminals of bistable means 18. This is accomplished by connecting terminal 48 of winding 45 of transformer 43 through diodes 49 and 50 to the base of an NPN transistor 51 and terminal 52 of winding 46 of transformer 43 through a jumper 53 and diodes 54 and 55 to the base of NPN transistor 56. The series connection of windings 45 and 46 is grounded. Diodes 49, 50, 54 and 55 are semiconductor threshold diodes of the type having little or no conduction until a potential of a predetermined minimum amplitude is applied thereacross. Until a predetermined potential is applied thereacross, these diodes act as high impedance barring the flow of current through windings 45 and 46 of transformer 43. After the conduction potential of these diodes has been reached, current flows through windings 45 and 46 of transformer 43.

Transistors 51, 56 of the bistable means are arranged to form the flip-flop 18. The emitters of transistors 51 and 56 are connected to a common ground while their collectors are connected to output terminals 57, 58, respectively. A pair of voltage dividers 60, 61 are connected across terminals 62 and 63. Terminals 62 and 63 are connected to plus 6 volt and minus 12 volt sources, respectively. Voltage divider 60 comprises resistors 64, 65 and 66 connected in series between terminals 62 and 63 with a common connection provided at node 67 between the voltage divider 60 and the base of transistor 51 and diode 50. Voltage divider 61 comprises resistors 68, 69 and 70 connected in series between terminals 62 and 63 with a common connection provided at node 71 between the voltage divider 61 and the base of transistor 56 and diode 55. The collector of transistor 51 is connected to voltage divider 61 at node 72 between resistors 68 and 69, and the collector of transistor 56 is connected to voltage divider 60 at node 73 between resistors 64 and 65.

The voltage dividers 60 and 61 help to establish the voltage values at nodes 67, 71, 72 and 73. Transistor 56 when conducting directly controls the voltage value of node 73 and node 67 via resistor 65, and transistor 51 when conducting directly controls the voltage value of node 72 and node 71 via resistor 69.

The negative going pulses produced at the dot end of winding 44 of transformer 43 produce negative going pulses to diodes 49 and 50, and positive going pulses to diodes 54 and 55. The negative pulse at diodes 49 and 50 biases the base of transistor 51 to its non-conductive state and the potential of nodes 71 and 72 associated with the collector of transistor 51 rise in potential. This condition of node 71 renders transistor 56 conductive. When transistor 56 is rendered conductive, the potential of node 73 is lowered.

The above described condition is reversed for a positive going polarized pulse at the dot end of winding 44 of transformer 43. This positive going pulse will cause a positive going pulse at terminal 48 of winding 45 of transformer 43 and a negative pulse at terminal 52 of winding 46 of transformer 43. The positive pulse will back bias diodes 49 and 50 and the negative pulse at diodes 54 and 55 will be applied to the base of transistor 56 rendering it non-conductive causing the potential of node 73 to rise. The rising of the potential of node 73 will rise the potential of node 67 and the base of transistor 51 rendering it conductive. The conduction of transistor 51 lowers the potential of node 72 and in turn lowers the potential at terminal 58 and renders transistor 56 non-conductive.

Thus, the polarity condition and duration thereof of nodes 72 and 73 represent the polarity condition and duration of the input wave A. The amplitude of the pulses appearing at terminals 57 and 58 of flip-flop 18 is controlled by clamping diodes 74 and 75, respectively. Diodes 74 and 75 are connected at one side to terminals 76 and 77, respectively, which terminals are each connected to a plus 3 volt source. The other sides of diodes diodes 74 and 75 are connected to conductor 78, node 73 and terminal 57, and conductor 79, node 72 and terminal 58, respectively.

The jumper 53 provides an inhibit or store circuit arrangement for retaining in memory a given condition of flip-flop 18. Once the output of the terminal 58 has risen to the point where it is clamped and its is desirable to inhibit any further action of the flip-flop, the flip-flop is rendered non-responsive to further transmission from transmission line 16. This is accomplished by merely removing jumper 53 from the conductor interconnecting winding 46 of transformer 43 and diode 54, thereby disconnecting transistor 56 from winding 46 of transformer 43. A negative pulse at terminal 52 of winding 46 will not reach transistor 56 because of the open circuit provided by the removal of jumper 53. A negative pulse received at terminal 48 of winding 45 and applied through diodes 49 and 50 to node 67 will lower the potential at node 67. Since transistor 51 is already non-conductive because its base is negative with respect to its emitter, rendering node 67 more negative merely retains transistor 51 in its non-conductive state. Thus, the flip-flop is inhibited from further action.

A reset circuit for flip-flop 18 is provided so that the bistable means may be kept in a given state when the communication system interconnecting the computer and its associated peripheral equipment is disconnected from the peripheral equipment. This reset circuitry comprises a relay switch contact 80 which is normally open when the associated peripheral equipment is de-energized and closed by a relay (not shown) in the associated peripheral equipment when the peripheral equipment is energized. Switch 80 connects a terminal 81 connected to a minus 3 volt source to the base of a NPN transistor 82 through a diode 83. Transistor 82 has its emitter grounded and its collector connected to output terminal 58 of flip-flop 18. When switch 80 is open because the associated peripheral equipment is de-energized, transistor 82 is rendered conductive because its base is rendered more positive than its emitter by current flow from terminal 84 connected to a plus 12 volt source through resistor 85, diode 83, resistor 86 to terminal 87 connected to a minus 12 volt source. Rendering transistor 82 conductive grounds output terminal 58.

When the associated peripheral equipment is energized, a relay associated therewith actuates switch 80 to its closed position. Diode 83 is now back biased by the minus 3 volt source at terminal 81, thereby lowering the potential at node 88 and rendering transistor 82 non-conductive. Flip-flop 18 may now be changed to either of its alternating steady states with output terminals 57 and 58 responding accordingly.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefor intended to cover and embrace any such modifications, within the limits only of the true spirit and scope of the invention.

What is claimed is:

1. In a communication system, generating means supplying signals carrying information, capacitive translating means for receiving said signals and for translating them into polarized pulses, an electric circuit coupled at one end to said capacitive translating means for transmittal of said pulses, impedance mismatching means for terminating said circuit, and a bistable means connected to said circuit at the other end thereof for reconstituting said signals, said pulses comprising a set and reset trigger for said bistable means.

2. In a communication system, generating means supplying signals carrying information, an electric circuit for receiving said signals, capacitive translating means connected in series with said circuit at one end thereof for receiving said signals and for translating them into polarized pulses for transmittal along said circuit, impedance mismatching means for terminating said circuit, and a bistable means connected to said circuit at the other end thereof for reconstituting said sigals, said pulses comprising a set and reset trigger for said bistable means.

3. In a communication system, generating means supplying signals carrying information, capacitive translating means for receiving said signals and for translating them into polarized pulses, an electric circuit coupled at one end to said capacitive translating means for transmittal of said pulses, impedance mismatching means for terminating said circuit with an impedance higher than said circuit, and a bistable means connected to said circuit at the other end thereof for reconstituting said signals, said pulses comprising a set and reset trigger for said bistable means.

4. In a communication system, generating means supplying signals carrying information, capacitive translating means for receiving said signals and for translating them into polarized pulses, an electric circuit coupled at one end to said capacitive translating means for transmittal of said pulses, impedance mismatching means for terminating said circuit with an impedance higher than said circuit, said impedance mismatching means amplifying said pulses, and a bistable means comprising a flip-flop connected to said circuit at the other end thereof for reconstituting said signals, said pulses comprising a set and reset trigger for said flip-flop.

5. In a communication system, generating means supplying signals carrying information, capacitive translating means for receiving said signals and for translating them into polarized pulses, an electric circuit coupled at one end to said capacitive translating means for transmittal of said pulses, impedance mismatching means for terminating said circuit with an impedance higher than said circuit, said impedance mismatching means amplifying said pulses, and a bistable means comprising a flip-flop connected to said circuit at the other end thereof and a pulse amplitude limiting means, said pulses comprising a set and reset trigger for said flip-flop, said flip-flop and said pulse amplitude limiting means reconstituting said signals.

6. In a communication system, generating means supplying signals carrying information, capacitive translating means for receiving said signals and for translating them into polarized pulses, an electric circuit coupled at one end to said capacitive translating means for transmittal of said pulses, impedance mismatching means for terminating said circuit with an impedance higher than said circuit, said impedance mismatching means amplifying said pulses at the terminating end of said circuit, a bistable means comprising a flip-flop having a pair of input terminals and a pair of output terminals, and pulse directing means connecting said circuit at the other end thereof to said bistable means, said pulse directing means steering said pulses according to their polarity to given ones of said input terminals, said pulses comprising a set and reset trigger for said bistable means, said bistable means reconstituting said signals at said output terminals.

7. In a communication system, generating means supplying signals carrying information, capacitive translating means for receiving said signals and for translating them into polarized pulses, an electric circuit coupled at one end of said capacitive translating means for transmittal of said pulses, impedance mismatching means for terminating said circuit with an impedance higher than said circuit, said impedance mismatching means amplifying said pulses at the terminating end of said circuit, a bistable means comprising a flip-flop having a pair of input terminals and a pair of output terminals, pulse directing means connecting said circuit at the other end thereof to said bistable means, said pulse directing means steering said pulses according to their polarity to given ones of said input terminals, said pulses comprising a set and reset trigger for said bistable means, said bistable means reconstituting said signals at said output terminals, and means connected to said flip-flop for inhibiting further receipt of said pulses thereby storing the given state of said flip-flop.

References Cited by the Examiner

UNITED STATES PATENTS

| | | | |
|---|---|---|---|
| 2,987,628 | 6/61 | Abbott et al. | 307—88.5 |
| 3,026,427 | 3/62 | Chisholm | 307—88.5 |

FOREIGN PATENTS

| | | |
|---|---|---|
| 1,115,295 | 10/61 | Germany. |

ARTHUR GAUSS, *Primary Examiner.*